United States Patent Office 3,151,082
Patented Sept. 29, 1964

---

3,151,082
POLYPHENYL ETHER STABILIZERS
Wesley L. Archer, Midland, Mich., assignor to The Dow Chemical Company, Midland, Mich., a corporation of Delaware
No Drawing. Filed Sept. 5, 1961, Ser. No. 135,723
3 Claims. (Cl. 252—52)

The present invention relates to antioxidants and viscosity improvers for polyphenyl ether high-temperature, high-pressure lubricants. More particularly the present invention concerns the use of and polyphenyl ether composition containing phenyl benzoate and/or diphenyl phthalate. These compounds have been tested and found to reduce the degradation of the class of high-temperature, high-pressure lubricants having the general formula

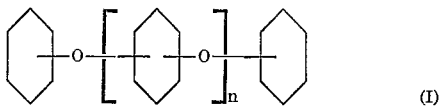
(I)

wherein $n$ is an integer from 2 to 6 or more. The employment of as little as 0.5% by weight of one of the stabilizer compounds based on the total weight of the total composition, will reduce degradation of the polyphenyl ether lubricants and thus reduce the viscosity increase of the lubricant composition due to such degradation. Good results are achieved when employing from about 0.5 to about 1.5% by weight of one of the stabilizer compounds.

It has been found that the viscosity of the polyphenyl ethers increases when degradation occurs under high-temperature operations. Therefore, the increase in viscosity became a convenient measure of the degree of degradation which occurs in polyphenyl ethers during high-temperature tests wherein oxygen was introduced to simulate actual operation as a lubricant in various systems. The use of viscosity as a measure of degree of degradation and/or stabilization resolved itself readily to the mathematical equation for percent improvement of stabilization according to the following equation:

$$\frac{V_1 - V_2}{V_1} \times 100 = \text{Percent stabilization}$$

$V_1$=Percent viscosity increase of unstabilized polyphenyl ether after oxidation treatment
$V_2$=Percent viscosity increase of stabilized polyphenyl ether after oxidation treatment The term "percent stabilization" is used hereinafter to have the meaning above assigned and is calculated as above set forth.

The following examples illustrate the present invention but are not to be construed as limiting.

*Example 1*

A 50 g. sample of bis(phenoxyphenyl)ether containing 1% by weight of phenyl benzoate (heated on a steam bath to dissolve the benzoate) was heated at 600° F. for 24 hours while bubbling 3 l. of air per hour through a sparger near the bottom of the liquid. The initial and final viscosity was determined by an Ostwald viscometer tube. An uninhibited check was treated in the same manner. The inhibited ether percent stabilization when compared to the check sample (uninhibited ether) was found to be 21.

*Example 2*

In a manner similar to that employed in Example 1, employing 1.0% by weight of diphenyl phthalate in place of phenyl benzoate, the percent stabilization was found to be 72.

I claim:
1. A high-pressure, high-temperature lubricant composition consisting essentially of a polyphenyl ether having the formula

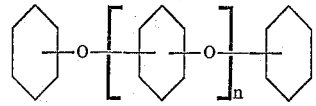

wherein $n$ represents an integer from 2 to 6, and, as the essential antioxidant and viscosity improver, an effective amount of a compound selected from the group consisting of phenyl benzoate, diphenyl phthalate and mixtures thereof.

2. A high-pressure, high-temperature lubricant composition consisting essentially of a polyphenyl ether having the formula

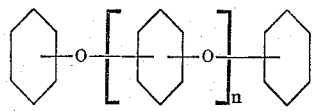

wherein $n$ represents an integer from 2 to 6, and from 0.5 to 1.5% by weight, based on the total composition, of phenyl benzoate.

3. A high-pressure, high-temperature lubricant composition consisting essentially of a polyphenyl ether having the formula

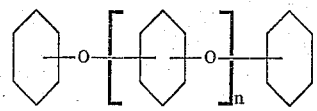

wherein $n$ represents an integer from 2 to 6, and from 0.5 to about 1.5% by weight, based on the total composition, of diphenyl phthalate.

References Cited in the file of this patent
UNITED STATES PATENTS

| | | |
|---|---|---|
| 2,215,590 | Maverick | Sept. 24, 1940 |
| 2,231,248 | Bowden | Feb. 11, 1941 |
| 2,347,217 | Prutton et al. | Apr. 25, 1944 |
| 2,940,929 | Diamond | June 14, 1960 |